United States Patent [19]

von dem Hagen

[11] Patent Number: 4,838,261
[45] Date of Patent: Jun. 13, 1989

[54] GAS METERING ARRANGEMENT

[75] Inventor: Tronje von dem Hagen, Lübeck, Fed. Rep. of Germany

[73] Assignee: Drägerwerk Aktiengesellschaft, Lübeck, Fed. Rep. of Germany

[21] Appl. No.: 167,131

[22] Filed: Mar. 11, 1988

[30] Foreign Application Priority Data

Mar. 12, 1987 [DE] Fed. Rep. of Germany ....... 3707942

[51] Int. Cl.$^4$ .............................................. A62B 9/02
[52] U.S. Cl. ......................... 128/205.24; 128/204.18; 128/204.21; 128/204.22
[58] Field of Search ..................... 128/204.18, 204.21, 128/204.22, 205.24

[56] References Cited

U.S. PATENT DOCUMENTS 4,651,730 3/1987 von dem Hagen et al. ... 128/204.21

Primary Examiner—Edgar S. Burr
Assistant Examiner—Aaron J. Lewis
Attorney, Agent, or Firm—Walter Ottesen

[57] ABSTRACT

The invention is directed to a gas metering arrangement which includes a measuring chamber with a measuring-chamber change-over valve and an expansion chamber with an expansion-chamber change-over valve. The chambers can be filled with a predetermined feed pressure from a gas source. These chambers are discharged via a blocking valve to a consumer by switching the valves when a predetermined pressure difference is reached between the respective pressures in said chambers and the pressure in a pressure chamber. The load on the individual switching valves is reduced and the metering of low gas quantities as well as high gas quantities is achieved with switching valves which are adapted to the different flow velocities. For this purpose, the expansion-chamber change-over valve is arranged in series with the measuring-chamber change-over valve with the outputs of the valves being connected to the output conduit of the metering arrangement. The expansion chamber is connected between the expansion-chamber change-over valve and the measuring-chamber change-over valve. The measuring and expansion chambers are initially empty and after they are filled, only the expansion-chamber change-over valve has to be brought into its switched position so that the stored large metering quantities can be supplied to the consumer at high velocities when the blocking valve is opened.

1 Claim, 1 Drawing Sheet

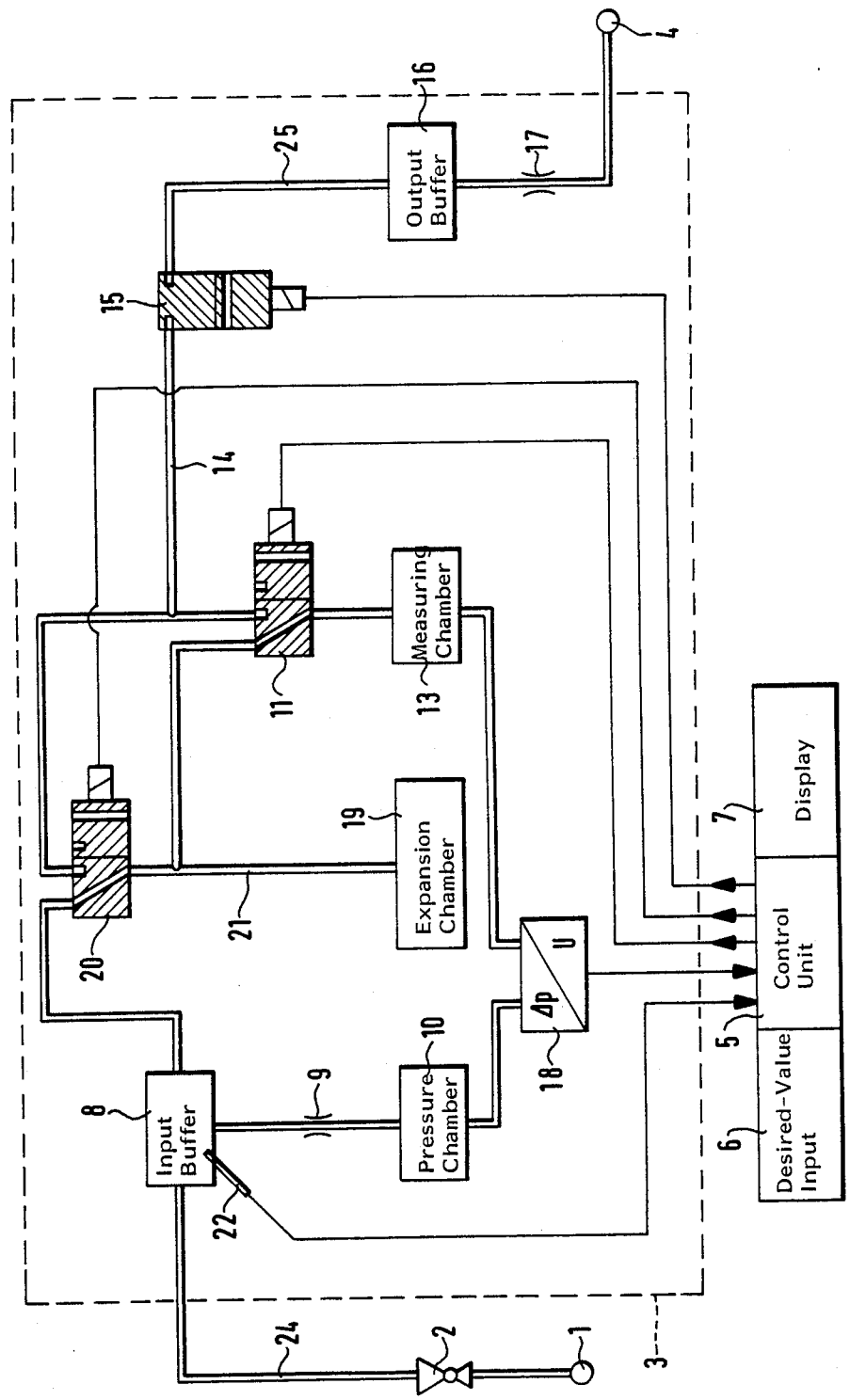

GAS METERING ARRANGEMENT

FIELD OF THE INVENTION

The invention relates to a gas metering arrangement which is especially applicable to medical apparatus.

BACKGROUND OF THE INVENTION

A gas metering arrangement of the kind referred to above is disclosed in U.S. Pat. No. 4,651,730 which is incorporated herein by reference.

With this known gas metering arrangement, small quantities of a gas at low flow velocity as well as large quantities at higher flow velocity can be metered to a consumer from a gas source. When small quantities are metered, a measuring chamber is filled via a change-over valve until a predeterminable pressure difference with reference to the pressure in a comparison-pressure chamber is reached. Thereafter, the change-over valve switches and allows the gas to flow out from the measuring chamber via a check valve which is now open to a consumer. When metering larger quantities at correspondingly higher flow velocity, an expansion chamber parallel to the measuring chamber is connected into the line supplying the expansion chamber via an expansion valve and the expansion chamber is filled. The change-over valve as well as the check valve again switch over after the pressure difference is reached so that now the measuring chamber as well as the expansion chamber can direct their respective metered gas quantities to the consumer.

With respect to the metering arrangement discussed above, it has been shown to be disadvantageous that emptying the measuring chamber and the expansion chamber to the consumer must occur via three valves when utilizing the connected expansion chamber. Dynamic pressure differences occur because of the high peak gas flows which develop because of the gas-flow resistances of the valves. These pressure differences reduce the accuracy of the metering and limit the maximum metering capacity for a predetermined static pressure condition.

In addition, the change-over valve ahead of the measuring chamber is always switched with the cycle frequency when metering smaller quantities as well as when metering larger quantities with the expansion chamber being switched in. This imposes extreme requirements with reference to the following: lower pass-through resistances, shorter switching times and thereby possibly higher cycle frequencies as well as a longer service life. The change-over valve must at the same time provide corresponding flow characteristics for low metering quantities at low flow speeds as well as large metering quantities at higher flow speeds. These requirements are difficult to realize in a single component.

SUMMARY OF THE INVENTION

Accordingly, it is an object of the invention to provide a gas metering arrangement of the kind referred to above which is improved so that the load of the individual switching elements is reduced. It is a further object of the invention to provide such a gas measuring arrangement wherein the metering of low gas quantities and high gas quantities can occur with respective switching elements which are also adapted to the different flow velocities.

The advantages of the invention are essentially that the expansion valve can remain in its first position when low gas flows are metered and that only the measuring-chamber change-over valve is switched into its first position for filling the measuring chamber and is switched into its second position for discharging the measuring chamber in accordance with the adjusted switching cycle. The expansion chamber is then continuously connected to the gas supply and serves as an additional buffering chamber. The measuring chamber change-over valve remains continuously in its first position for metering larger gas quantities at higher flow velocities so that in this case, the measuring chamber as well as the expansion chamber are filled and both are discharged into the output line via the expansion valve switched into its second position. In this way, only one change-over valve switches for each of the two metering regions so that the measuring chamber and the expansion chamber are always emptied via only two valves. This is especially advantageous for metering large gas quantities at high flow velocities because the dynamic pressure differences reduced in this manner improve the metering accuracy and permit higher peak gas flows thereby increasing the metering capacity. The switching work of the measuring valve and expansion valve is divided when low and high gas flows are utilized approximately to the same extent so that with their increased service life, the service life of the gas metering arrangement is also increased.

BRIEF DESCRIPTION OF THE DRAWING

The invention will now be described with reference to the drawing which is a block diagram of the gas metering arrangement according to a preferred embodiment of the invention.

DESCRIPTION OF THE PREFERRED EMBODIMENTS OF THE INVENTION

The metering unit 3 is supplied with gas from a gas source 1 via a pressure reducer 2 and a line 24 and delivers metered gas to a consumer (not illustrated) via an outlet 4. A control unit 5 controls the metering unit 3 on the basis of signals which it receives from the metering unit 3 and the desired-value input 6. The adjusted values and possible disturbances are indicated on a display 7.

In the metering unit 3, an input buffer 8 is connected with the pressure reducer 2 via a tubular line 24 and a pressure chamber 10 is connected with the input buffer 8 via a throttle 9. The input buffer 8 further includes a connecting line to the input of an expansion valve 20 which is shown in its first switching position. In this first switching position, the input buffer 8 is connected with an expansion chamber 19 via a tubular line 21. The output of the expansion valve 20 is connected to a blocking valve 15 via a diverting line 14. The tubular line 21 is connected to the input of the measuring-chamber valve 11 and the diverting line 14 is connected to the output of the measuring-chamber valve 11. The input of the valve 11 is connected with the measuring chamber 13 when the measuring-chamber valve 11 is in its first position as shown. The pressure chamber 10 as well as the measuring chamber 13 have connecting lines to a differential pressure sensor 18 which delivers a voltage signal to the control unit 5.

The blocking valve 15 is blocked in its first position as shown and a consumer line 25 leads to an output buffer 16 at the downstream end of the valve 15. The output buffer 16 opens to the outlet 4 via an output throttle 17.

The control unit 5 receives the signal from the differential-pressure sensor 18 as well as a temperature value measured by the temperature sensor 22. The temperature sensor 22 is mounted in the input buffer 8 and measures the input temperature of the gas to be metered. For corresponding temperature variations, the temperature sensor 22 delivers a correction possibility for the metered quantity to the control unit 5.

For metering a predetermined quantity of gas and at the beginning of a metering operation, the pressure chamber 10, expansion chamber 19 and measuring chamber 13, which are all initially empty, are filled from the gas source 1 with a feed pressure via the input buffer 8. At this time, the expansion valve 20 and the measuring-chamber valve 11 are in their respective first positions shown in the drawing.

During the filling operation, a predetermined pressure difference between the pressure chamber 10 and the measuring chamber 13 is measured by the difference-pressure sensor 18. The throttle 9 prevents the pressure in the pressure chamber 10 from temporarily falling below the operating pressure with the filling surge of the measuring chamber 13 and then prevents that by means of the pressure-differential sensor 18 the desired difference is determined at too low a pressure and so prevents a switch-over from being initiated.

After reaching a predeterminable pressure difference, the expansion valve 20 switches into its second position so that the content of the expansion chamber 19 and of the measuring chamber 13 is present in the diverting line 14 ahead of the blocking valve 15 which is still in its first (blocking) position as shown in the drawing. After a certain delay time which is predetermined for a precise pressure measurement by the control unit 5, the blocking valve 15 too is then switched to its second position and the expansion chamber 19 and the measuring chamber 13 can empty via the output buffer 16. Large gas quantities to be metered and high flow velocities are then not deleterious to a precise metering. Only when the pressure in the measuring chamber 13 has dropped so far that a further predeterminable pressure difference is measured by the pressure sensor 18 and transmitted to the control unit 5, does the blocking valve 15 switch back into its first position thereby interrupting the emptying or discharging operation. After a delay time, which is given by the control unit 5 and determined by means of the cycling frequency, the expansion valve 20 also switches back into its first position and the metering cycle begins again with the filling operation.

If only small gas quantities at low flow velocities are to be metered, and assuming the valves (11, 20, 15) are in their respective first positions shown, only the measuring-chamber valve 11 is switched into its second position when the filling pressure is reached whereby only the volume of the measuring chamber 13 is present ahead of the blocking valve 15 which is still in its first (blocked) position. The content of the measuring chamber 13 can discharge via the consumer line 25 to the output 4 after the blocking valve 15 switches into its second position. After the pressure in the measuring chamber 13 drops to a predetermined pressure value, the blocking valve 15 and, after a predetermined delay time, also the measuring valve 11, are again switched back into their respective first positions and the filling operation can begin anew. The predetermined pressure value to which the pressure in the measuring chamber 13 drops is measured by the pressure-difference sensor 18 and delivered to the control unit 5.

The variations in the switching times of the valves are controllable independently of each other. By means of these variations of the switching times of the expansion valve 20 and/or measuring-chamber valve 11 on the one hand, and the blocking valve 15 on the other hand, different filling times and thereby metering quantities as well as different cycling times for discharging the respective chambers 13 and 19 can be obtained.

It is understood that the foregoing description is that of the preferred embodiments of the invention and that various changes and modifications may be made thereto without departing from the spirit and scope of the invention as defined in the appended claims.

What is claimed is:

1. A gas metering arrangement comprising:

gas supply means;

a gas supply conduit;

a pressure chamber permanently connected to said gas supply means via said supply conduit;

an outlet conduit for supplying metered gas to a consumer;

a diverting conduit;

a controllable blocking valve having an input connected to said diverting conduit and an outlet connected to said outlet conduit and being switchable between a first position wherein said outlet conduit is blocked and a second position wherein said outlet conduit is clear so that metered gas can flow to the consumer;

a measuring chamber;

an expansion chamber;

a controllable measuring-chamber change-over valve having an input connected to said expansion chamber and an output connected to said diverting conduit, said change-over valve being connected to said measuring chamber and being switchable between a first position wherein said measuring chamber is connected to said expansion chamber and a second position wherein said measuring chamber is connected to said diverting conduit;

an expansion-chamber change-over valve having an input connected to said supply conduit and an output connected to said diverting conduit, said expansion-chamber change-over valve being connected to said expansion chamber and being switchable between a first position wherein said expansion chamber is connected to said supply conduit and a second position wherein said expansion chamber is connected to said diverting conduit;

sensor means for detecting a plurality of predetermined pressure differences between respective sets of gas pressures in said pressure and measuring chambers and for issuing a plurality of signals indicative of corresponding ones of said pressure differences;

control means for selectively switching said valves from a base mode wherein no gas is metered to the consumer into a low-flow mode wherein a first quantity of gas is metered to the consumer at a first flow velocity and from said base mode into a high-flow mode wherein a second quantity of gas is metered to the consumer at a second flow velocity, said second quantity being greater than said first quantity and said second flow velocity being greater than said first flow velocity;

said base mode corresponding to a base condition wherein said valves are all in their respective first positions thereby causing said measuring chamber and said expansion chamber to be both connected to said gas supply means and causing said outlet conduit to be blocked;

said low-flow mode corresponding to a low-flow condition wherein said measuring-chamber change-over valve and said blocking valve are in their respective second positions;

said high-flow mode corresponding to a high-flow condition wherein said expansion-chamber change-over valve and said blocking valve are in their respective second positions;

for metering said first quantity of gas to the consumer, said control means responding to a first one of said signals to switch said measuring-chamber change-over valve and said blocking valve into said second positions thereof thereby establishing said low-flow condition and causing said measuring chamber to be connected to said output line for discharging said first quantity of gas from said measuring chamber at said first velocity into said output conduit and to said consumer; said control means then responding to a second one of said signals for switching said blocking valve into said first position thereof and thereafter switching said measuring-chamber change-over valve into said first position thereof to thereby return said valves to said base-mode condition; and, for metering said second quantity of gas to the consumer, said control means responding to a third one of said signals to switch said expansion-chamber change-over valve and said blocking valve into said second positions thereof thereby establishing said high-flow condition and causing said expansion chamber and said measuring chamber to be connected to said output conduit for discharging said second quantity of gas conjointly from both of said expansion and measuring chambers at said second velocity into said output conduit and to said consumer; said control means then responding to a fourth one of said signals for switching said blocking valve into said first position thereof and thereafter switching said expansion-chamber change-over valve into said first position thereof to thereby return said valves to said base-mode condition.

* * * * *

UNITED STATES PATENT AND TRADEMARK OFFICE
CERTIFICATE OF CORRECTION

PATENT NO.   : 4,838,261
DATED        : June 13, 1989
INVENTOR(S)  : Tronje von dem Hagen It is certified that error appears in the above-identified patent and that said Letters Patent is hereby corrected as shown below:

In column 5, line 23: delete "line" and substitute -- conduit -- therefor.

Signed and Sealed this

Ninth Day of July, 1991

Attest:

HARRY F. MANBECK, JR.

*Attesting Officer*    *Commissioner of Patents and Trademarks*